(12) United States Patent
Or et al.

(10) Patent No.: US 10,965,133 B2
(45) Date of Patent: Mar. 30, 2021

(54) BATTERY PACK SYSTEM FOR ELECTRICALLY CONNECTING A BATTERY PACK TO A MACHINE

(71) Applicants: Dongguan Chen Da Appliance Co. Ltd., Guangdong (CN); Defond Components Limited, Chai Wan (HK)

(72) Inventors: Tak Chuen Or, Chai Wan (HK); Cheng Chen Nieh, Chai Wan (HK); Kin Yu Wong, Chai Wan (HK)

(73) Assignees: Defond Electech Co., Ltd., Guangdong (CN); Defond Components Limited, Chai Wan (HK)

( * ) Notice: Subject to any disclaimer, the term of this patent is extended or adjusted under 35 U.S.C. 154(b) by 222 days.

(21) Appl. No.: 15/807,429

(22) Filed: Nov. 8, 2017

(65) Prior Publication Data
US 2018/0175647 A1 Jun. 21, 2018

(30) Foreign Application Priority Data
Dec. 16, 2016 (HK) .................................. 16114381.0

(51) Int. Cl.
*H02J 7/00* (2006.01)
*B25F 5/02* (2006.01)
(Continued)

(52) U.S. Cl.
CPC .............. *H02J 7/0044* (2013.01); *B25F 5/02* (2013.01); *H01M 2/1022* (2013.01); *H01M 2/34* (2013.01);
(Continued)

(58) Field of Classification Search
CPC ........ H02J 7/004; H02J 7/0042; H02J 7/0065; H02J 7/0029; H02J 7/0063; B25F 5/02;
(Continued)

(56) References Cited

U.S. PATENT DOCUMENTS 5,222,670 A 6/1993 Huang
6,296,065 B1 * 10/2001 Carrier ...................... B25F 5/02
173/171
(Continued)

FOREIGN PATENT DOCUMENTS

CN 1369132 A 9/2002
CN 1499656 A 5/2004
(Continued)

OTHER PUBLICATIONS

European Patent Office, "Extended European Search Report" in connection with related European Patent Application No. 17200511.8, dated Jan. 25, 2018, 7 pgs.

*Primary Examiner* — Harshad C Patel
(74) *Attorney, Agent, or Firm* — Kolisch Hartwell, P.C.

(57) ABSTRACT

A battery pack system for use in connecting a battery pack to a battery pack receiving member of a machine so that the battery pack is operable to supply a suitable amount of power to the machine for operation of the machine via an electrical circuit path that is configurable for electrically connecting the battery pack to the machine, the system including: a first electrical connector member disposed along a first region of the electrical circuit path; and a second electrical connector member; wherein, responsive to the battery pack being connected to the battery pack receiving member of the machine, the second electrical connector member is configured for movement relative to the first electrical connector member to cooperatively form a first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to coopera-
(Continued)

tively form a second configuration which electrically opens the electrical circuit path via which the suitable amount of power is not able to be supplied from the battery pack to the machine.

5 Claims, 18 Drawing Sheets

(51) Int. Cl.
    *H01M 2/10*     (2006.01)
    *H02H 7/18*     (2006.01)
    *H01M 2/34*     (2006.01)

(52) U.S. Cl.
    CPC ............. *H02H 7/18* (2013.01); *H02J 7/0042* (2013.01); *B23B 2260/024* (2013.01); *H01M 2200/00* (2013.01); *H01M 2220/30* (2013.01); *H02J 7/0029* (2013.01); *H02J 7/0063* (2013.01); *H02J 2207/20* (2020.01)

(58) Field of Classification Search
    CPC .. H01M 2/1022; H01M 2220/30; H02H 7/18; B23B 2260/024
    USPC .................................. 173/171, 170; 439/188
    See application file for complete search history.

(56) References Cited

U.S. PATENT DOCUMENTS

| | | | | |
|---|---|---|---|---|
| 6,551,123 | B1* | 4/2003 | Schaeffeler | H01H 9/06 |
| | | | | 439/374 |
| 7,253,585 | B2* | 8/2007 | Johnson | H02J 7/0044 |
| | | | | 320/112 |
| 7,589,500 | B2* | 9/2009 | Johnson | B25F 5/00 |
| | | | | 320/134 |
| 7,997,352 | B2* | 8/2011 | Hashimoto | B25F 5/02 |
| | | | | 173/170 |
| 9,172,115 | B2* | 10/2015 | Kolden | H01M 10/425 |
| 2005/0218867 | A1* | 10/2005 | Phillips | H01M 2/1027 |
| | | | | 320/114 |
| 2006/0091852 | A1* | 5/2006 | Watson | B25F 5/02 |
| | | | | 320/114 |
| 2006/0268504 | A1* | 11/2006 | Shimizu | B25F 5/02 |
| | | | | 439/155 |
| 2007/0108944 | A1 | 5/2007 | Pellenc | |
| 2008/0185993 | A1* | 8/2008 | Johnson | H02J 7/0044 |
| | | | | 320/118 |
| 2009/0242227 | A1* | 10/2009 | Hashimoto | B25F 5/02 |
| | | | | 173/217 |
| 2010/0116517 | A1* | 5/2010 | Katzenberger | B25F 5/00 |
| | | | | 173/20 |
| 2010/0320969 | A1 | 12/2010 | Sakakibara et al. | |
| 2013/0026857 | A1* | 1/2013 | Schmid | H02J 7/0036 |
| | | | | 307/328 |
| 2015/0322844 | A1* | 11/2015 | Kim | B60H 1/00864 |
| | | | | 123/41.05 |
| 2015/0357684 | A1 | 12/2015 | Willgert et al. | |
| 2016/0294093 | A1* | 10/2016 | Ogura | B25F 5/00 |
| 2016/0322842 | A1* | 11/2016 | Sorhage | H02J 7/007 |
| 2016/0322844 | A1* | 11/2016 | Pickens | H02J 7/0044 |
| 2019/0081290 | A1* | 3/2019 | Fauteux | H01M 2/105 |

FOREIGN PATENT DOCUMENTS

| | | |
|---|---|---|
| CN | 104871344 A | 8/2015 |
| CN | 104900824 A | 9/2015 |

* cited by examiner

Three layer of battery assembly – each connected in series

BATTERY PACK SYSTEM FOR ELECTRICALLY CONNECTING A BATTERY PACK TO A MACHINE

TECHNICAL FIELD

The present invention relates to battery packs, which may include removable battery packs, such as those used in hand-held power tools and the like.

BACKGROUND OF THE INVENTION

Hand-held electric power tools and the like typically include a battery receiving compartment via which a battery pack may be attached. Typically the battery pack may be removably connectable with the electric power tool which is convenient in that when the battery pack is faulty and requires replacement or is in need of being recharged, it may be easily removed and replaced by with another battery pack. As the power rating capability of hand-held electric tools has increased over the years, the power output of the battery packs used in such tools has also increased significantly with some battery packs being capable of outputting over 100 Wh in certain cases. Unfortunately, in view of this increase in the power output capacity of such battery packs, concerns have been raised that there is a greater risk of a fire erupting should the battery terminals be inadvertently short-circuited, for instance, when such battery packs are being stored or shipped.

If the above short-circuit scenario were to occur whilst being shipped on an aeroplane, the outcome may be catastrophic. For this reason, commercial airlines are now required to restrict the transport of battery packs which exceed a threshold power output rating. One approach to addressing this problem has been to manually disconnect the circuitry within the battery pack which connects multiple battery modules together so that the overall potential power output capacity of the battery pack may be minimized in the event of a short circuit. However, as this solution requires manual manipulation of the electric circuitry within the battery pack prior to shipping and then manually reconnecting the electrical circuitry within the battery pack again once shipped, such a solution is considered to be unduly complicated and costly.

SUMMARY OF THE INVENTION

The present invention seeks to alleviate at least one of the above-described problems.

The present invention may involve several broad forms. Embodiments of the present invention may include one or any combination of the different broad forms herein described.

In one broad form, the present invention provides a system for use in connecting a battery pack to a battery pack receiving member of a machine so that the battery pack is operable to supply a suitable amount of power to the machine for operation of the machine via an electrical circuit path that is configurable for electrically connecting the battery pack to the machine, the system including:

a first electrical connector member disposed along a first region of the electrical circuit path; and a second electrical connector member corresponding to the first electrical connector member;

wherein, responsive to the battery pack being connected to the battery pack receiving member of the machine, the second electrical connector member is configured for movement relative to the first electrical connector member to cooperatively form a first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form a second configuration which electrically opens the electrical circuit path via which the suitable amount of power is not able to be supplied from the battery pack to the machine.

Preferably, the machine may include an electric power tool or an electrical gardening tool.

Preferably, the electrical circuit path may include a primary electrical circuit path that is configurable for electrically connecting the battery pack to the machine when the battery pack is connected to the battery pack receiving member of the machine.

Preferably, the battery pack may include a plurality of discrete battery cells that may be configured for electrical connection in either series or parallel via a secondary electrical circuit path.

Alternatively and/or additionally, the electrical circuit path may include the secondary electrical circuit path.

Typically, the first electrical connector member may be disposed along a region of the primary electrical circuit path, the region of the primary electrical circuit path being located on the battery pack, and the second electrical connector member being disposed on the machine.

Typically, the first electrical connector member may be disposed along a region of the primary electrical circuit path, the region of the primary electrical circuit path being located on the battery pack, and the second electrical connector member being disposed on the battery pack.

Typically, the first electrical connector member may be disposed along a region of the primary electrical circuit path, the region of the primary electrical circuit path being located on the machine, and the second electrical connector member being disposed on the machine.

Typically, the first electrical connector member may be disposed along a region of the secondary electrical circuit path and the second electrical connector member may be disposed on the battery pack.

Typically, the first electrical connector member may be disposed along a region of the secondary electrical circuit path and the second electrical connector member may be disposed on the machine.

Typically, the first electrical connector member may include a fixed electrical contact member of an electrical switch disposed along a region of the electrical circuit path and the second electrical contact member includes a movable electrical contact member of the electrical switch:

wherein, responsive to the battery pack being connected to the battery pack receiving member of the machine, the second electrical connector member is configured for movement relative to the first electrical connector member to cooperatively form the first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form the second configuration which electrically opens the electrical circuit path via which the suitable amount of power is not able to be supplied from the battery pack to the machine.

Typically, the first electrical connector member may include a female-type electrical contact and the second electrical connector member includes a male-type electrical contact of an electrical switch disposed along a region of the electrical circuit path:

wherein, responsive to the battery pack being connected to the battery pack receiving member of the machine, the male portion of the second electrical connector member is configured for being received within the female portion of the first electrical connector to cooperatively form the first configuration which electrically closes the electrical circuit path via which the suitable amount of power is able to be supplied from the battery pack to the machine; and wherein, responsive to the battery pack being disconnected from the battery pack receiving member of the machine, the male portion of the second electrical connector member is not received within the female portion of the first electrical connector member to cooperatively form the second configuration which electrically opens the electrical circuit path via which the suitable amount of power is not able to be supplied from the battery pack to the machine.

Typically, the electrical switch may include an actuator member operably coupled to the second electrical connector member wherein, responsive to the battery pack being connected to the battery pack receiving member of the machine, the actuator member is configured for movement in a first direction along a movement axis to actuate movement of the second electrical connector member into the first configuration with the first electrical connector member, and wherein, responsive to the battery pack being disconnected from the battery pack receiving member of the machine, the actuator member is configured for movement in a second direction along the movement axis to actuate movement of the second electrical connector member into the second configuration with the first electrical connector member.

Typically the present invention may include a pair of first electrical connector members and a pair of second electrical connector members corresponding to the pair of first electrical connector members:

wherein, responsive to the battery pack being connected to the battery pack receiving member of the machine, the second electrical connector members are configured for movement relative to their corresponding first electrical connector members to cooperatively form first configurations which electrically close the electrical circuit path via which the suitable amount of power is able to be supplied from the battery pack to the machine; and wherein, responsive to the battery pack being disconnected from the battery pack receiving member of the machine, the second electrical connector members are configured for movement relative to their corresponding first electrical connector members to cooperatively form second configurations which electrically open the electrical circuit path via which the suitable amount of power is not able to be supplied from the battery pack to the machine.

In a further broad form, the present invention provides a battery pack for connection with a battery pack receiving member of a machine so that the battery pack is operable to supply a suitable amount of power to the machine for operation of the machine via an electrical circuit path that is configurable for electrically connecting the battery pack to the machine:

wherein, responsive to the battery pack being connected to the battery pack receiving member of the machine, a second electrical connector member is configured for movement relative to a first electrical connector member disposed along a region of the first electrical circuit path to cooperatively form a first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form a second configuration which electrically opens the electrical circuit path via which the suitable amount of power is not able to be supplied from the battery pack to the machine.

Preferably, the machine may include an electric power tool or an electrical gardening tool.

Preferably, the electrical circuit path may include a primary electrical circuit path that is configurable for electrically connecting the battery pack to the machine when the battery pack is connected to the battery pack receiving member of the machine.

Preferably, the battery pack may include a plurality of discrete battery cells that are configured for electrical connection in series or parallel via a secondary electrical circuit path.

Alternatively and/or additionally, the electrical circuit path may include the secondary electrical circuit path.

Typically, the first electrical connector member may be disposed along a region of the primary electrical circuit path, the region of the primary electrical circuit path being located on the battery pack, and the second electrical connector member is disposed on the machine.

Typically, the first electrical connector member may be disposed along a region of the primary electrical circuit path, the region of the primary electrical circuit path being located on the battery pack, and the second electrical connector member is disposed on the battery pack.

Typically, the first electrical connector member may be disposed along a region of the primary electrical circuit path, the region of the primary electrical circuit path being located on the machine, and the second electrical connector member is disposed on the machine.

Typically, the first electrical connector member maybe disposed along a region of the secondary electrical circuit path and the second electrical connector member is disposed on the battery pack.

Typically, the first electrical connector member may be disposed along a region of the secondary electrical circuit path and the second electrical connector member is disposed on the machine.

Typically, the first electrical connector member may include a fixed electrical contact member of an electrical switch disposed along a region of the electrical circuit path and the second electrical contact member may include a movable electrical contact member of the electrical switch:

wherein, responsive to the battery pack being connected to the battery pack receiving member of the machine, the second electrical connector member is configured for movement relative to the first electrical connector member to cooperatively form the first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form the second configuration which electrically opens the electrical circuit path via which the suitable amount of power is not able to be supplied from the battery pack to the machine.

Typically, the first electrical connector member may include a female-type electrical contact and the second electrical connector member may include a male-type electrical contact of an electrical switch disposed along a region of the electrical circuit path:

wherein, responsive to the battery pack being connected to the battery pack receiving member of the machine, the male portion of the second electrical connector member is configured for being received within the female portion of the first electrical connector to cooperatively form the first configuration which electrically closes the electrical circuit path via which the suitable amount of power is able to be supplied from the battery pack to the machine; and wherein, responsive to the battery pack being disconnected from the battery pack receiving member of the machine, the male portion of the second electrical connector member is not received within the female portion of the first electrical connector member to cooperatively form the second configuration which electrically opens the electrical circuit path via which the suitable amount of power is not able to be supplied from the battery pack to the machine.

Typically, the electrical switch may include an actuator member operably coupled to the second electrical connector member wherein, responsive to the battery pack being connected to the battery pack receiving member of the machine, the actuator member is configured for movement in a first direction along a movement axis to actuate movement of the second electrical connector member into the first configuration with the first electrical connector member, and wherein, responsive to the battery pack being disconnected from the battery pack receiving member of the machine, the actuator member is configured for movement in a second direction along the movement axis to actuate movement of the second electrical connector member into the second configuration with the first electrical connector member.

Typically, the present invention may include a pair of first electrical connector members and a pair of second electrical connector members corresponding to the pair of first electrical connector members:

wherein, responsive to the battery pack being connected to the battery pack receiving member of the machine, the second electrical connector members are configured for movement relative to their corresponding first electrical connector members to cooperatively form first configurations which electrically close the electrical circuit path via which the suitable amount of power is able to be supplied from the battery pack to the machine; and wherein, responsive to the battery pack being disconnected from the battery pack receiving member of the machine, the second electrical connector members are configured for movement relative to their corresponding first electrical connector members to cooperatively form second configurations which electrically open the electrical circuit path via which the suitable amount of power is not able to be supplied from the battery pack to the machine.

In a further broad form, the present invention provides a method for connecting a battery pack to a battery pack receiving member of a machine so that the battery pack is operable to supply a suitable amount of power to the machine for operation of the machine via an electrical circuit path that is configurable for electrically connecting the battery pack to the machine, the method including the steps of:

(i) providing a first electrical connector member disposed along a first region of the electrical circuit path; and (ii) providing a second electrical connector member;

wherein, responsive to the battery pack being connected to the battery pack receiving member of the machine, the second electrical connector member is configured for movement relative to the first electrical connector member to cooperatively form a first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form a second configuration which electrically opens the electrical circuit path via which the suitable amount of power is not able to be supplied from the battery pack to the machine.

Preferably, the machine may include an electric power tool or an electrical gardening tool.

Preferably, the electrical circuit path may include a primary electrical circuit path that is configurable for electrically connecting the battery pack to the machine when the battery pack is connected to the battery pack receiving member of the machine.

Preferably, the battery pack may include a plurality of discrete battery cells that may be configured for electrical connection in series or parallel via a secondary electrical circuit path.

Alternatively and/or additionally, the electrical circuit path may include the secondary electrical circuit path.

Typically, the first electrical connector member may be disposed along a region of the primary electrical circuit path, the region of the primary electrical circuit path being located on the battery pack, and the second electrical connector member is disposed on the machine.

Typically, the first electrical connector member may be disposed along a region of the primary electrical circuit path, the region of the primary electrical circuit path being located on the battery pack, and the second electrical connector member is disposed on the battery pack.

Typically, the first electrical connector member may be disposed along a region of the primary electrical circuit path, the region of the primary electrical circuit path being located on the machine, and the second electrical connector member is disposed on the machine.

Typically, the first electrical connector member may be disposed along a region of the secondary electrical circuit path and the second electrical connector member is disposed on the battery pack.

Typically, the first electrical connector member may be disposed along a region of the secondary electrical circuit path and the second electrical connector member is disposed on the machine.

Typically, the first electrical connector member may include a fixed electrical contact member of an electrical switch disposed along a region of the electrical circuit path and the second electrical contact member may include a movable electrical contact member of the electrical switch:

wherein, responsive to the battery pack being connected to the battery pack receiving member of the machine, the second electrical connector member is configured for movement relative to the first electrical connector member to cooperatively form the first configuration which electrically closes the electrical circuit path via which the suitable amount of power is able to be supplied from the battery pack to the machine; and wherein, responsive to the battery pack being disconnected from the battery pack receiving member of the machine, the second electrical connector member is configured for movement relative to the first electrical connector member to cooperatively form the second configuration which electrically opens the electrical circuit path via which the suitable amount of power is not able to be supplied from the battery pack to the machine.

Typically, the first electrical connector member may include a female-type electrical contact and the second electrical connector member may include a male-type electrical contact of an electrical switch disposed along a region of the electrical circuit path:

wherein, responsive to the battery pack being connected to the battery pack receiving member of the machine, the male portion of the second electrical connector member is configured for being received within the female portion of the first electrical connector to cooperatively form the first configuration which electrically closes the electrical circuit path via which the suitable amount of power is able to be supplied from the battery pack to the machine; and wherein, responsive to the battery pack being disconnected from the battery pack receiving member of the machine, the male portion of the second electrical connector member is not received within the female portion of the first electrical connector member to cooperatively form the second configuration which electrically opens the electrical circuit path via which the suitable amount of power is not able to be supplied from the battery pack to the machine.

Typically, the electrical switch may include an actuator member operably coupled to the second electrical connector member wherein, responsive to the battery pack being connected to the battery pack receiving member of the machine, the actuator member is configured for movement in a first direction along a movement axis to actuate movement of the second electrical connector member into the first configuration with the first electrical connector member, and wherein, responsive to the battery pack being disconnected from the battery pack receiving member of the machine, the actuator member is configured for movement in a second direction along the movement axis to actuate movement of the second electrical connector member into the second configuration with the first electrical connector member.

Typically, the present invention may include a step of providing a pair of first electrical connector members and a pair of second electrical connector members corresponding to the pair of first electrical connector members:

wherein, responsive to the battery pack being connected to the battery pack receiving member of the machine, the second electrical connector members are configured for movement relative to their corresponding first electrical connector members to cooperatively form first configurations which electrically close the electrical circuit path via which the suitable amount of power is able to be supplied from the battery pack to the machine; and wherein, responsive to the battery pack being disconnected from the battery pack receiving member of the machine, the second electrical connector members are configured for movement relative to their corresponding first electrical connector members to cooperatively form second configurations which electrically open the electrical circuit path via which the suitable amount of power is not able to be supplied from the battery pack to the machine.

Preferably, with reference to all broad forms of the present invention described herein, the battery pack may include a battery pack configured for removable connection to and from the machine.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF THE PREFERRED EMBODIMENTS

Preferred embodiments of the present invention will now be described herein with reference to FIGS. 1 to 18. The embodiments include a removable battery pack (100), as well as a system and method for connecting the removable battery pack with a power tool (200). The power tool (200) may include for instance a hand-held electric tool such as a drill having an electric motor for turning a drill bit, although it would be appreciated and understood that this is merely for illustrative purposes and alternate embodiments of the present invention may of course be suitably configured for use in relation to other types of electric power tools such as grinders, sanders, saws, rotary driving tools as well as electric gardening tools and so on. Typically, additional electrical circuitry such as control and over-current circuitry modules, a trigger switch and so on may be located along the electrical circuit path on the power tool between the input power terminals of the power tool and the electric motor or actuator (e.g. solenoid) of the power tool.

The removable battery pack (100) includes a housing within which the plurality of individual battery cells (130) are securely arranged in a three-layer configuration with electrical terminals of the battery cells (130) being connected by a secondary electrical circuit path (150) in a series configuration. In these embodiments, the removable battery pack (100) also includes a PCB (190) with electronic circuitry for providing a range of functions including for instance over-current protection and high temperature protection.

Figure 1:
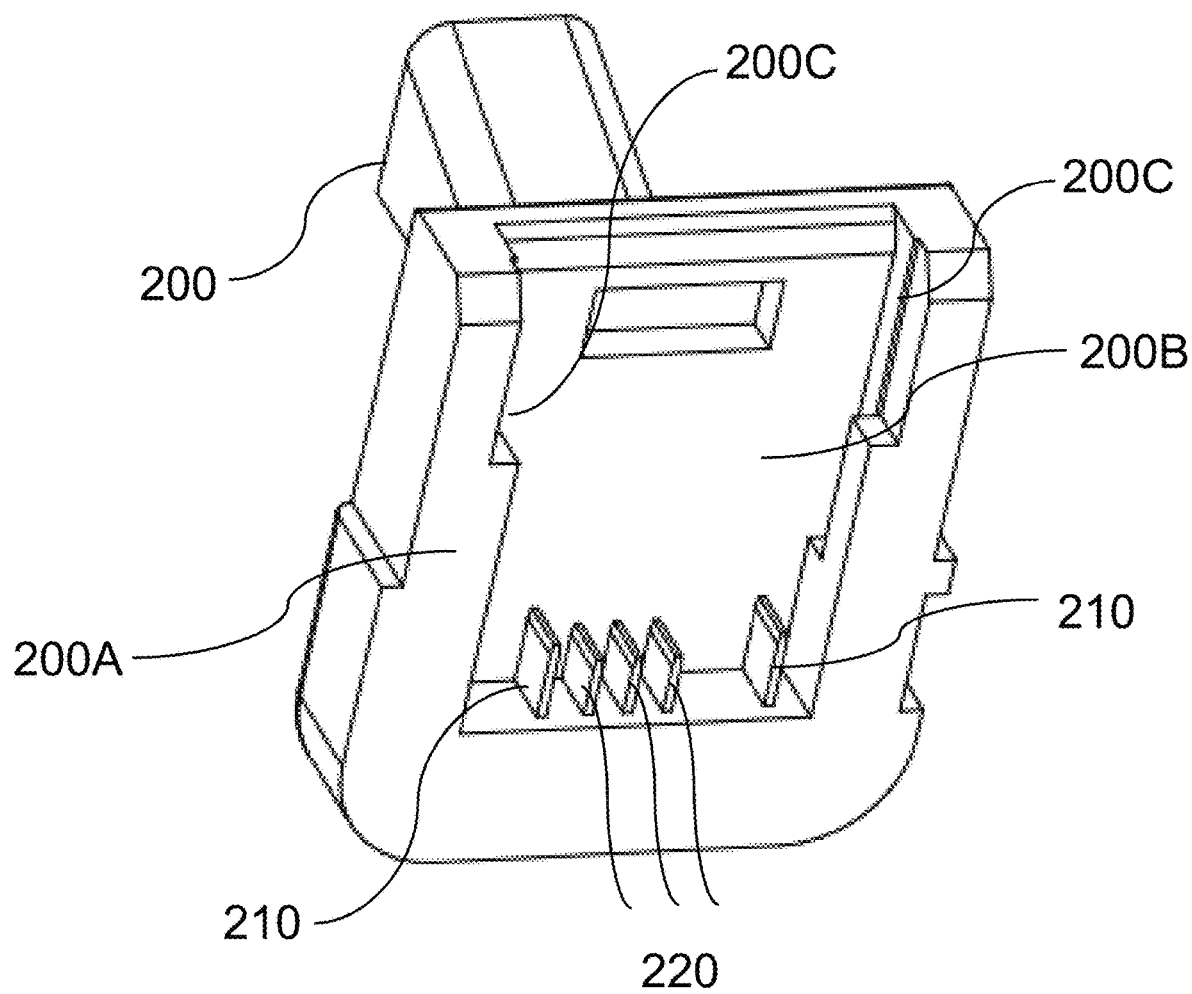
FIG. 1 shows a bottom perspective view of a battery pack receiving member located on a base section of a power tool in accordance with a first embodiment of the present invention.
Figure 3:
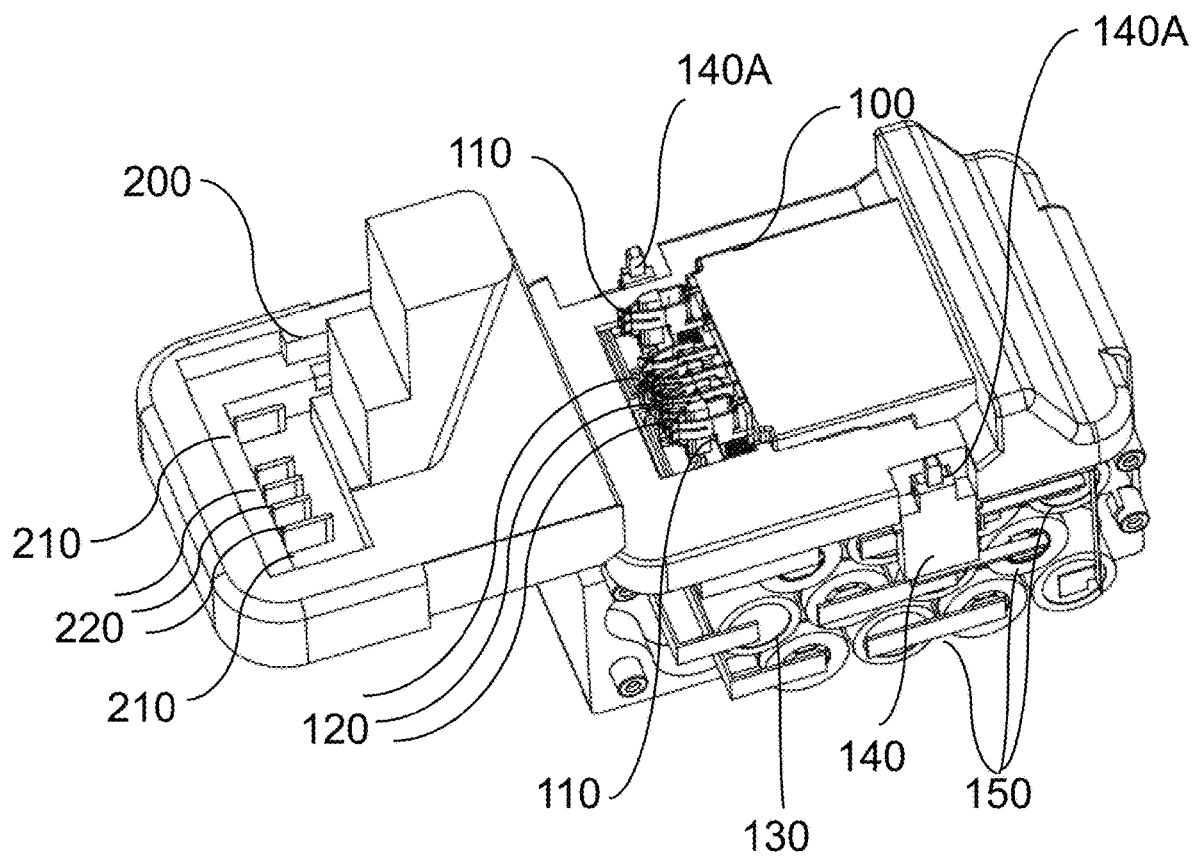
FIG. 3 shows a top perspective cut-away view of the removable battery pack of the base section of the power tool detached from one other in accordance with the first embodiment of the present invention.
Figure 4:
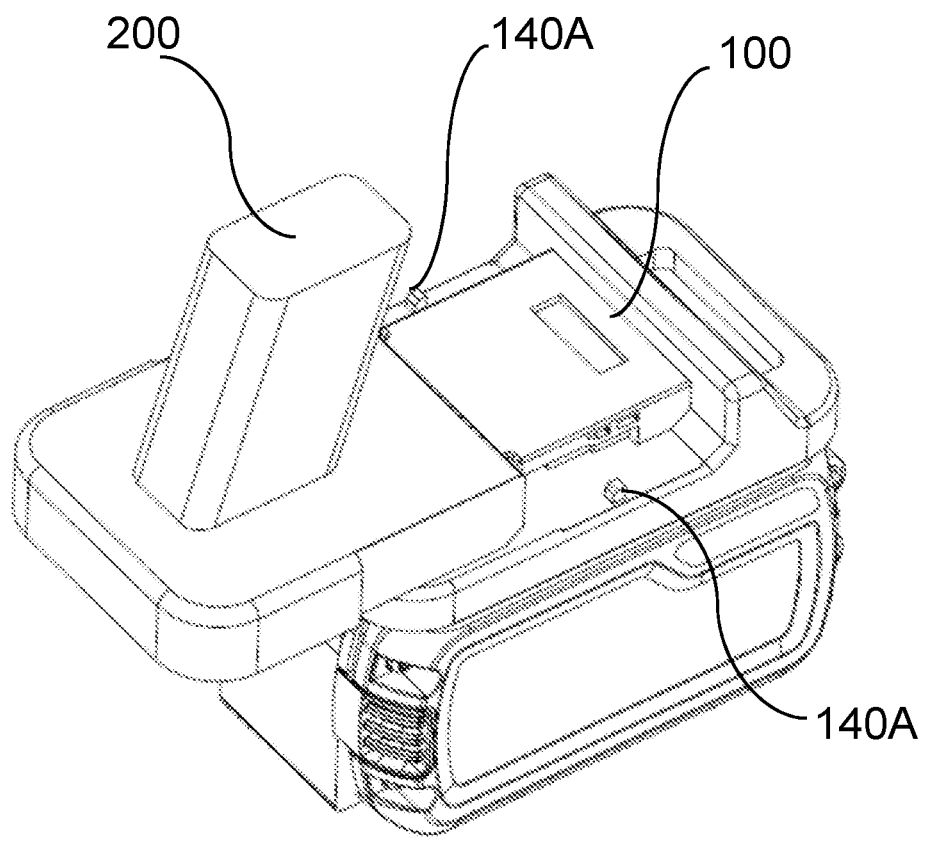
FIG. 4 shows a top perspective view of the removable battery pack as it is being slidably connected within the battery pack receiving member located on the base of the power tool in accordance with the first embodiment of the present invention.
Figure 5:
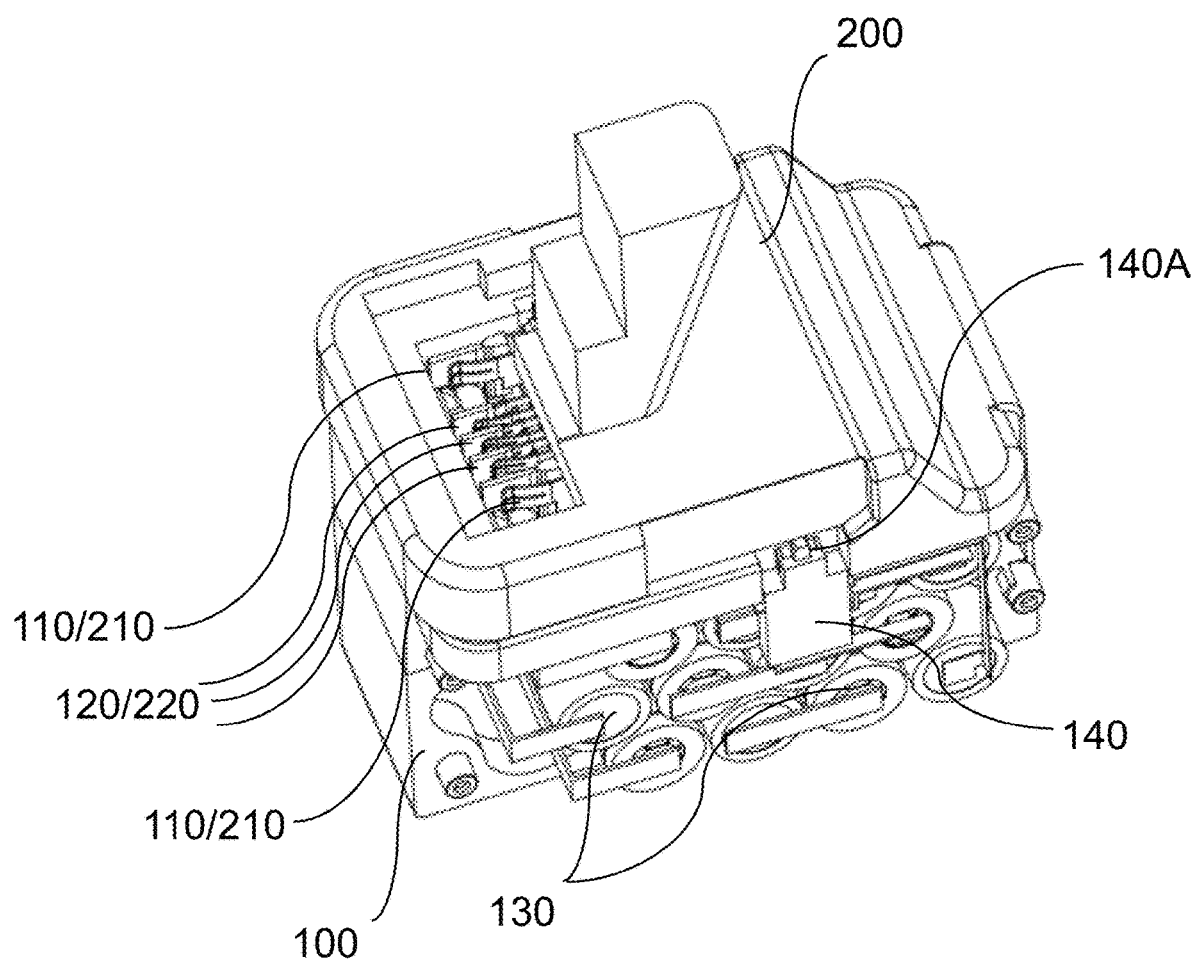
FIG. 5 shows a top perspective cut-away view of the removable battery pack when it is removably connected to the battery pack receiving member located on the base section of the power tool, in accordance with the first embodiment of the present invention.
Figure 10:
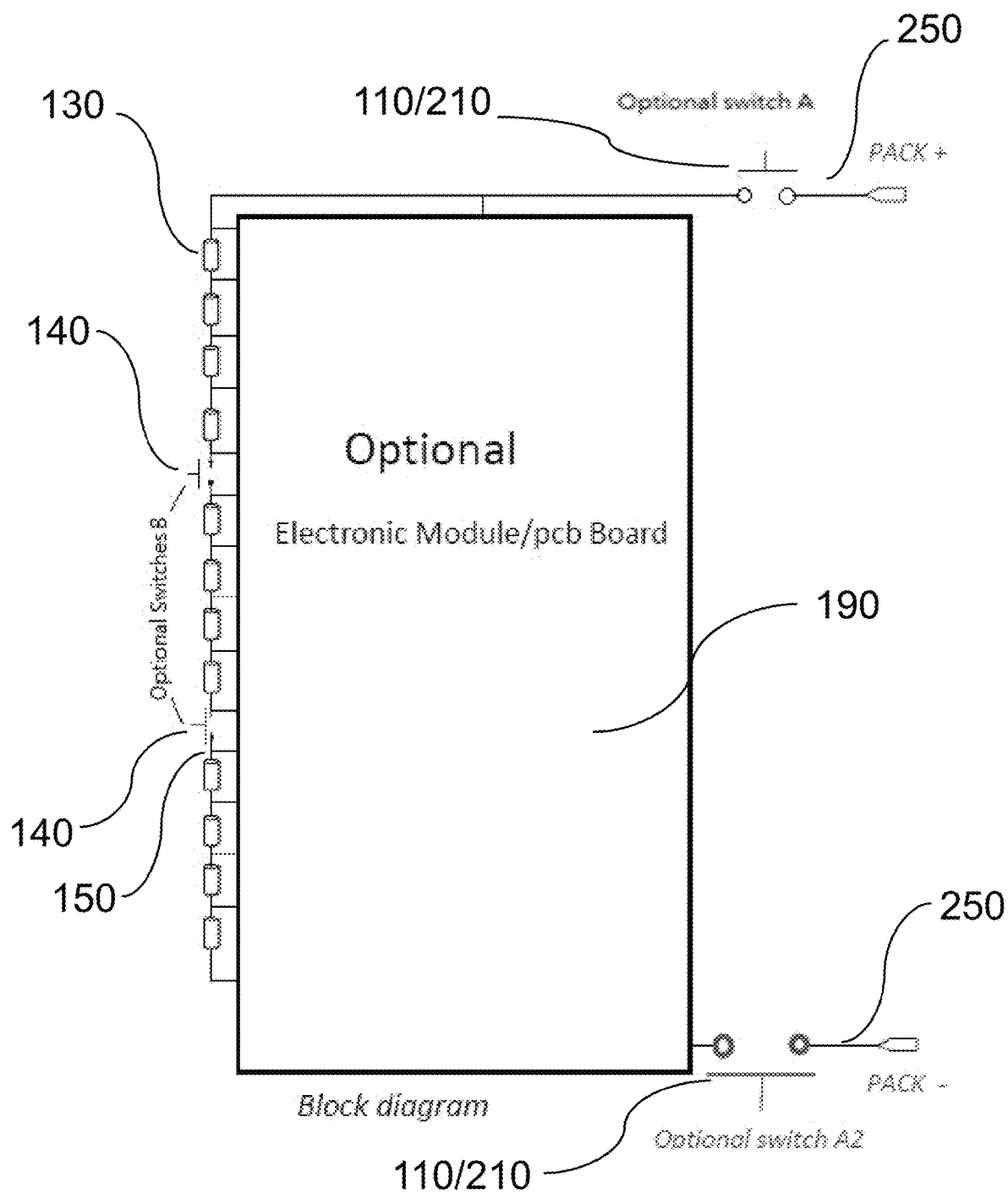
FIG. 10 shows an example circuit block diagram of the electrical circuit path comprising a primary electrical circuit path connecting the battery pack to a motor or solenoid of the power tool and a secondary electrical circuit path connecting the battery cells of the battery pack, in accordance with an embodiment of the present invention.

Referring firstly to FIG. 1, a bottom perspective view of a battery pack receiving member (200A) is shown located on a base section of the power tool (200). The battery pack receiving member (200A) includes a recess (200B) having a shape contour including locating tracks (200C) integrally formed in walls of the recess (200B) to allow a corresponding shape contour of the removable battery pack (100) to be slidable along the tracks (200C) when effecting connection of the removable battery pack (100) with the power tool (200). Additional locking mechanisms (not shown) will be employed to releasably lock the battery pack (100) into position relative to the battery pack receiving member (200A) and to prevent it from inadvertently sliding out of the tracks (200C) in the recess (200B). A plurality of conductive prongs protrude in parallel within the recess (200B) of the battery pack receiving member (200A). The three innermost conductive prongs comprise electrical power input terminals (210) configured for engaging with corresponding electrical output power terminals (120) located on the removable battery pack (100) when the battery pack (100) is connected to the power tool (200) to effect electrical communication therebetween. The outer-most conductive prongs comprise first electrical connector members (210) which are configured for connection with corresponding second electrical connector members (110) located on the removable battery pack (100). The first electrical connector members (210) and their corresponding second electrical connector members (110) are movable relative to each other into at least first closed configurations (such as depicted in 5) and second opened configurations (such as depicted in FIG. 3) depending upon whether the battery pack (100) is connected or disconnected from the power tool (200) and collectively act as contact members of primary cut-off switches (110,210) for opening of the primary electrical circuit path (250) when the battery is disconnected from the power tool (200) and closing of the primary electrical circuit path (250) when the battery pack (100) is connected to the power tool (200). The second electrical connector members (110) are located along regions of the primary electrical circuit path (250) disposed on the battery pack (100) (as shown in FIG. 10) and include female portions for securely receiving male portions of the corresponding first electrical connector members (210) when the battery pack (100) is connected to the power tool (200). When the male portions of the first electrical connector members (210) are not received within the female portions of the second electrical connector members (110) disposed on the battery pack (100), the regions where the second electrical connector members (110) are located along the primary electrical circuit path (250) are effectively opened so that a suitable amount of power from the battery pack (100) cannot flow from the battery pack output power terminals (120) to the power tool in order to power components of the power tool via the electrical circuit path. It is only when the first electrical connector members (210) are suitably received within the corresponding second electrical connector members (110) that the connected first and second electrical connector members (110,210) cooperate to electrically close the regions of the primary electrical circuit path (250) where they are located. The cut-away view of FIG. 5 shows the male portions of the pair of first electrical connector members (210) received within the female portions of the corresponding second electrical connector members (110), and at the same time, power connection terminals (120,220) connected between the battery pack (100) and the power tool (200). Whilst in this embodiment, two primary cut-off switches (110,120) (formed by the pairs of first and second electrical connector members) are provided along the primary electrical circuit path (250) it would be understood that it is a design choice and only one primary cut-off switch may instead be located along the primary electrical circuit path (250) such as shown in the example electric circuit diagrams of FIGS. 11-13.

Figure 2:
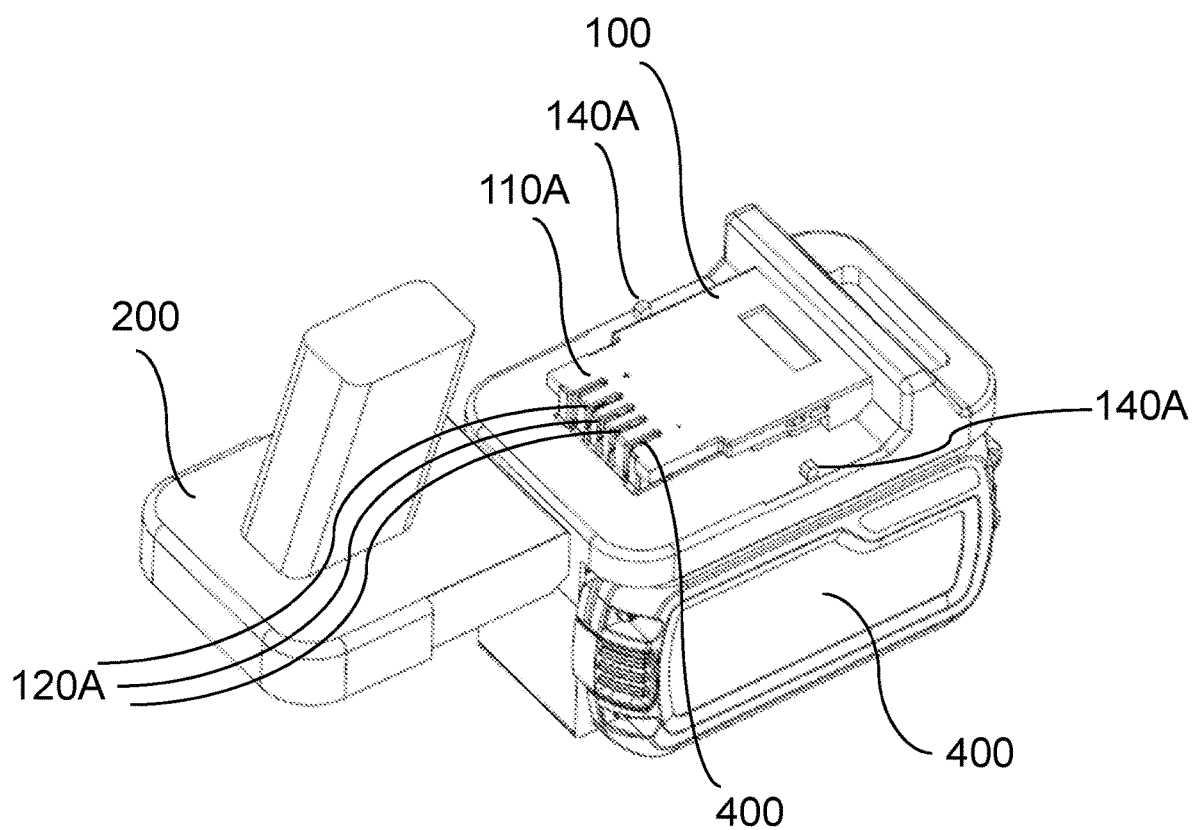
FIG. 2 shows a perspective view of a removable battery pack and a base section of a power tool detached from one another in accordance with the first embodiment of the present invention.

Referring now to FIG. 2, a top perspective view is shown of a removable battery pack (100) and a base section of the power tool (200) detached from one another. FIG. 3 further shows a cut-away view of the top of the power tool (200) base with conductive prongs (i.e. outermost pair of first electrical connector members and inner-most input power terminals) protruding within the recess (200B) of the battery pack receiving member (200A). FIG. 3 also shows a top perspective view of the battery pack (100) with a top cover removed to reveal the second electrical connector members (110) and output power terminals (120) of the battery pack. The top cover of the battery pack (100) as shown in FIG. 2 minimizes exposure of the electrical power output prongs (120) and the second electrical connector members (110) yet is suitable shaped and dimensioned to allow electrical connection with the connectors of the power tool (200) through a series of slots cut-out (120A,110A) disposed in the top cover respectively.

The battery pack (100) also includes a pair of secondary electrical cut-off switches (140) that are located along regions of the secondary electrical circuit path (150) on the battery pack (100) which connects the battery cells (130) in series. FIGS. 3 and 5 show cut-away views of the battery pack (100) in which one of the secondary electrical cut-off switches (140) can be seen physically arranged on a side of the battery pack (100) adjacent the series connected battery terminals. The secondary electrical cut-off switches (140) comprise respective actuators (140A) which are biased to a Normally Opened configuration as shown in FIG. 3 when the battery pack (100) is disconnected from the power tool (200). The secondary electrical cut-off switches (140) are configured to be arranged in closed configurations as shown in FIG. 5 when the battery pack (100) is connected to the power tool (200). The switch actuators (140A) of the secondary electrical cut-off switches (140) are biased by return springs (not shown) so that the actuators (140A) are ordinarily urged outwardly of the switch housings (140) when the battery pack (100) is disconnected form the power tool (200) and are configured for being urged relatively inwardly of the switch housings (140) when a surface of the base of the power tool (200) abuts against the actuators (140A) of the switches (140) during connection whereby the actuators (140A) actuate movement of movable electrical contact members in the secondary electrical cut-off switches (140) into contact with corresponding fixed electrical contact members resulting in closure of the secondary electrical cut-off switches (140) located along the secondary electrical circuit path (150). It would be appreciated that in alternate embodiments of the present invention it is possible that any number other actuator mechanisms may be suitably employed including magnetic-based actuation mechanisms and the like.

Figure 6:
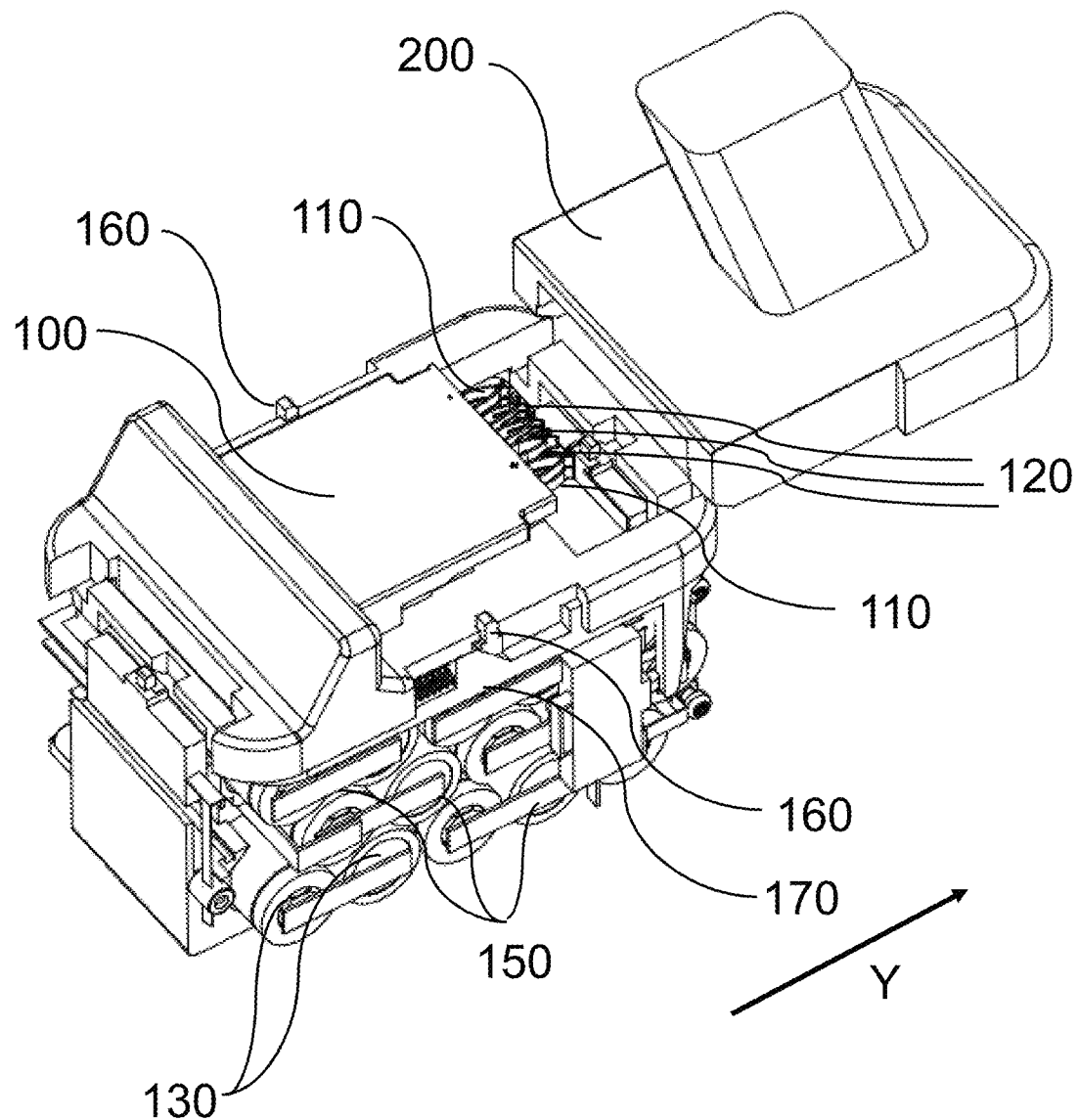
FIG. 6 shows a top perspective view of a removable battery pack and a base section of a power tool detached from one another in accordance with a second embodiment of the present invention.
Figure 7:
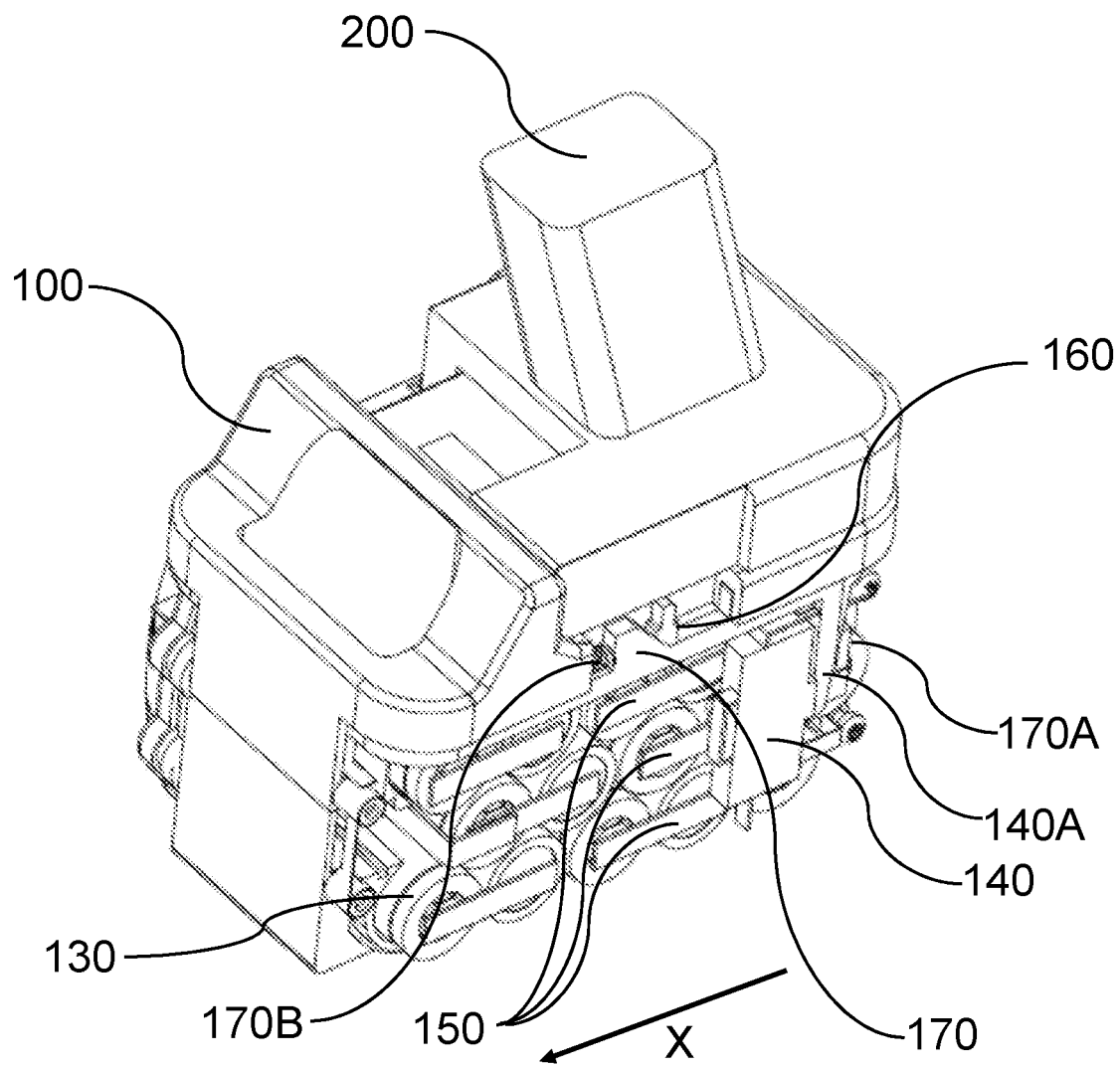
FIG. 7 shows a top perspective view of the removable battery pack and the base section of the power tool operably connected to one another in accordance with the second embodiment of the present invention.

FIGS. 6 and 7 show another embodiment of the present invention in which the secondary electrical cut-off switches (140) located on the secondary electrical circuit path (150) on the battery pack (100) comprise a different actuation mechanism. In this alternate embodiment, a frame member (170) is disposed around a peripheral region of the battery pack (100) which is configured for slidable movement in at least a first direction (X) along a movement axis when the battery pack (100) is slidably connected to the power tool as shown in FIG. 7. The frame member (170) slides in the first direction (X) along the movement axis due to driving members (160) pressing downward against it in a direction orthogonal to the first direction (X) of movement of the frame member (170). The driving members (160) are themselves urged downwardly against the frame member (170) by the virtue of a surface of the power tool (200) abutting against it during connection with the battery pack (100). The driving members (160) and regions of the frame member (170) with which the driving members (160) abut against are suitably shaped and contoured to facilitate such interaction and resulting movement. As the frame members (170) move in the first direction (X) along the movement axis (as shown in FIG. 7), frame arms (170A) of the frame members (170) press against the actuator members (140A) of the secondary electrical cut-off switches (140) so as to close the secondary electrical cut-off switches (140) located along the secondary electrical circuit path (150) that electrically connects terminals of the battery cells (130) in series. Conversely, when the battery pack (100) is disconnected from the base of the power tool (200), a return spring (170B) operably coupled to the frame member (170) urges the frame member (170) in a second direction along the movement axis (Y) (as shown in FIG. 6) back into its original position whereby the actuators (140A) of the secondary electrical cut-off switches (140) are able to extend outwardly of the switch housings (140) again to open the electrical switches (140) and thereby cut-off full electrical connectivity amongst at least a section of the battery cells (130) in the battery pack (100). Advantageously, as both the frame member (170) includes an independent return spring (170B) and the secondary electrical cut-off switches (140) located on the secondary electrical circuit path (150) each include their own return springs (not shown), the combined operation of the several return springs assists in ensuring that the secondary electrical cut-off switches (140) are urged in to opened configurations when the battery pack (100) is disconnected from the power tool (200) so as to minimize or at least alleviate a relatively high output capacity of the battery and potential damage arising in the event of inadvertent short-circuiting of the battery pack (100) terminals for instance during storage or shipping. The multiple return spring arrangement further provides the advantage of redundancy such that if one return spring were to fail, the remaining return spring would assist in alleviating risk of closure of the secondary electrical cut-off switches (140) located on the battery pack (100) during storage and shipping.

When the removable battery pack (100) is connected with a battery pack receiving member (200A) located in a base section of the power tool (200), power from the battery pack (100) may be supplied from the battery pack (100) to the power tool (200) via an electrical circuit path comprising a primary electrical circuit path (250) between the power terminals of the battery pack and input terminals of the power tool motor, in combination with, a secondary electrical circuit path (150) which electrically connects the individual battery cells (130) within the battery pack (100).

Figure 11:
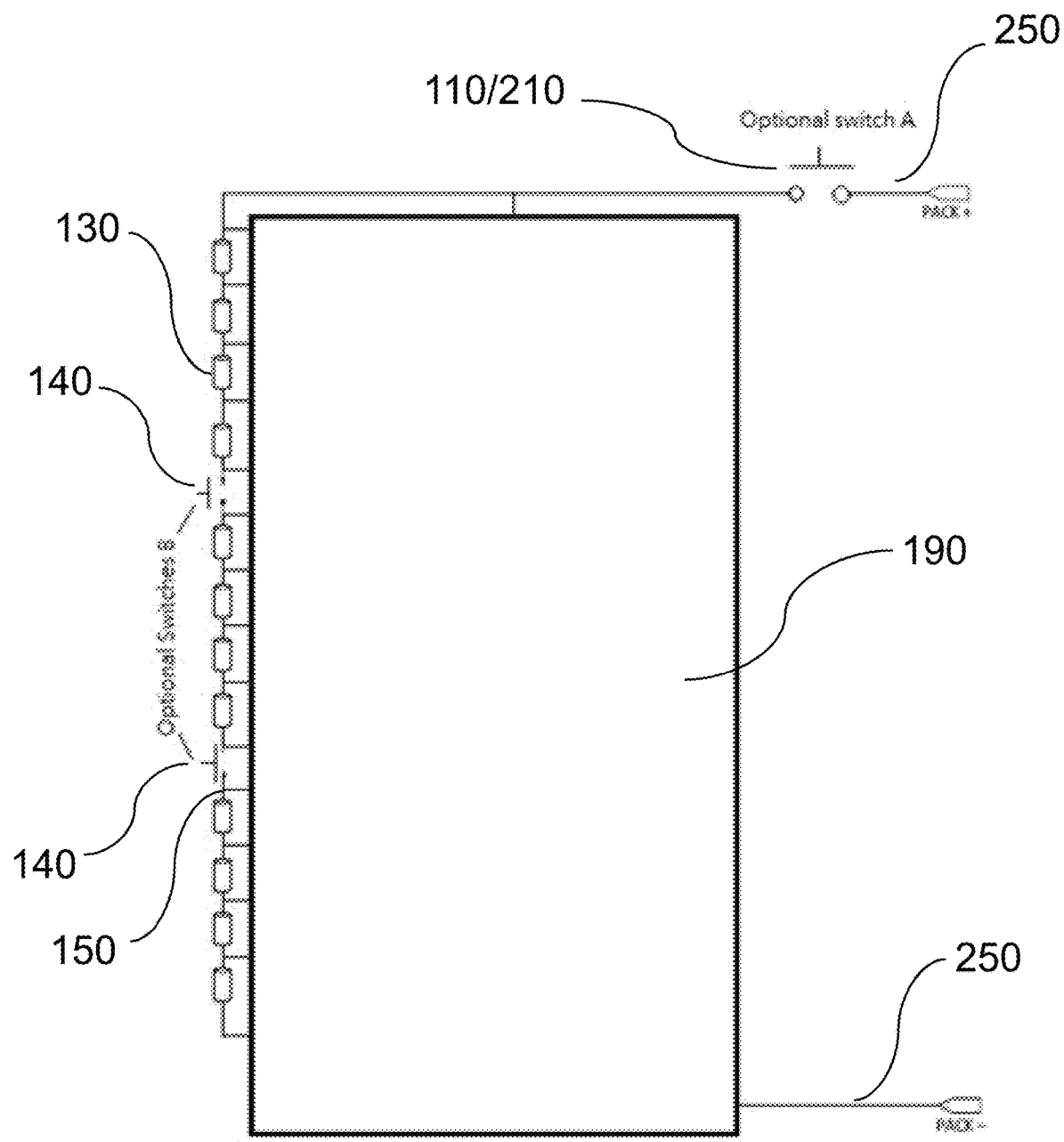
FIG. 11 shows another example circuit block diagram of the electrical circuit path comprising a primary electrical switch located on a region of the primary electrical circuit path connecting the battery pack to a motor of the power tool, and, a pair of secondary electrical cut-off switches located on regions of the secondary electrical circuit path connecting the battery cells of the battery pack, the primary electrical switch and the pair of secondary electrical cut-off switches each being arranged in Normally Opened states before slidable connection of the removable battery pack with battery pack receiving member of the power tool, in accordance with an embodiment of the present invention.
Figure 12:
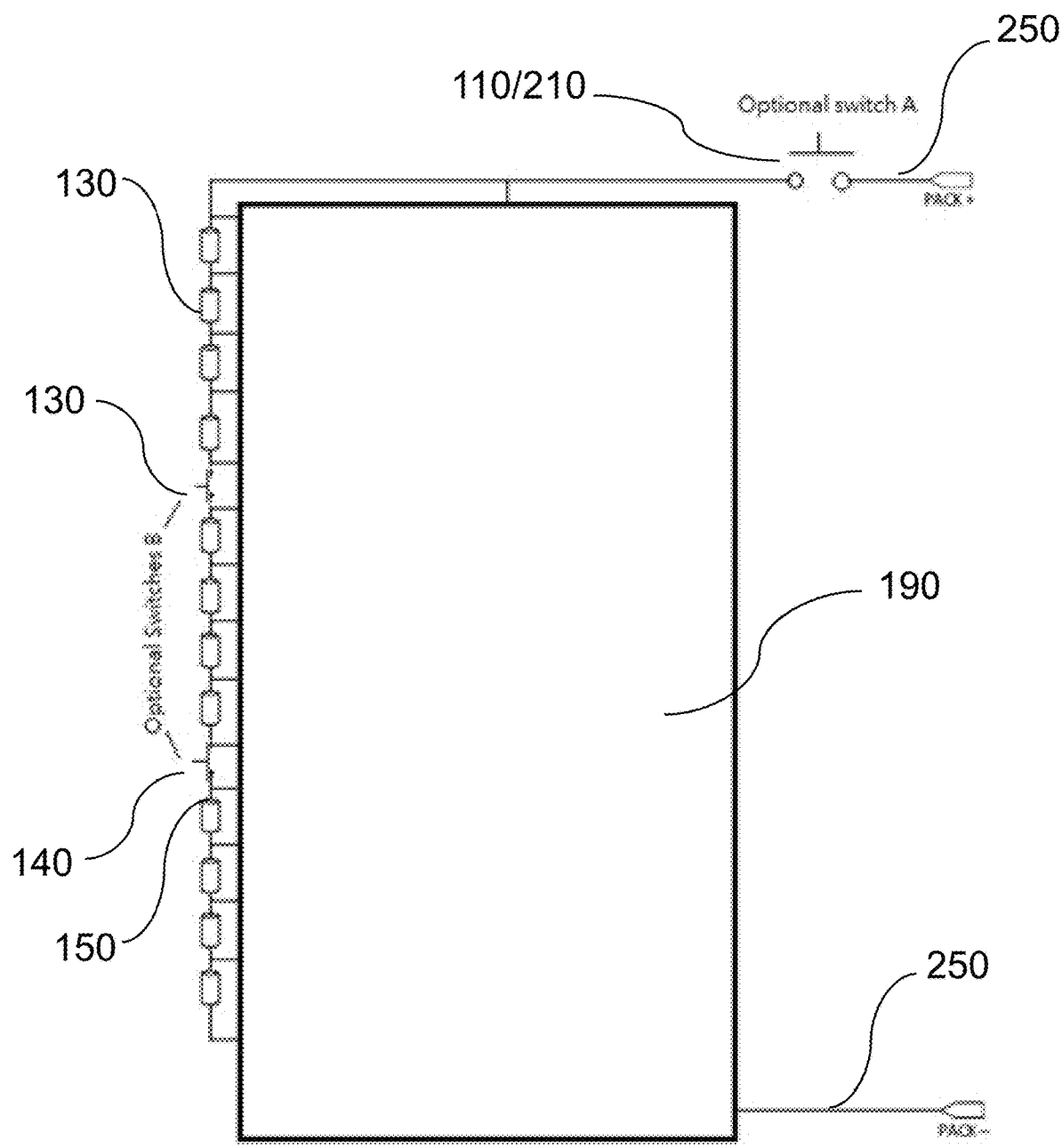
FIG. 12 shows the example circuit block diagram of FIG. 11 wherein the pair of secondary electrical cut-off switches are shown being first to close as the removable battery pack is partially slidably connected with the battery pack receiving member of the power tool and prior to the primary switch being closed when the removable battery pack has been fully slidably connected with the battery pack receiving member of the power tool, in accordance with an embodiment of the present invention.
Figure 13:
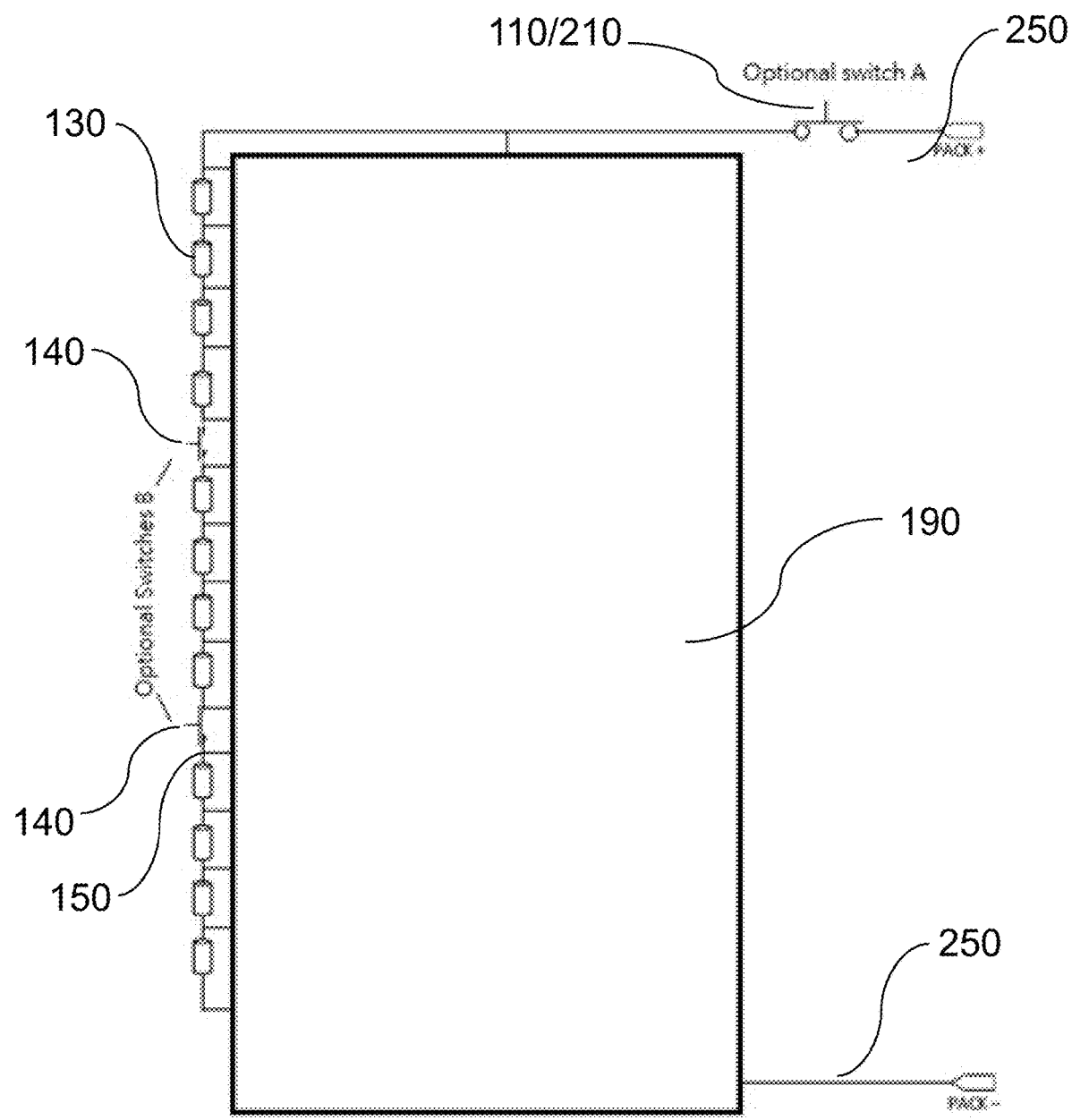
FIG. 13 shows the example circuit block diagram of FIG. 11 when the removable battery pack has been fully slidably connected with the battery pack receiving member of the power tool whereby the primary electrical switch has subsequently been closed after the pair of secondary electrical cut-off switches have been closed to enable supply of power from the removable battery pack to a motor of the power tool via the electrical circuit path.
Figure 14:
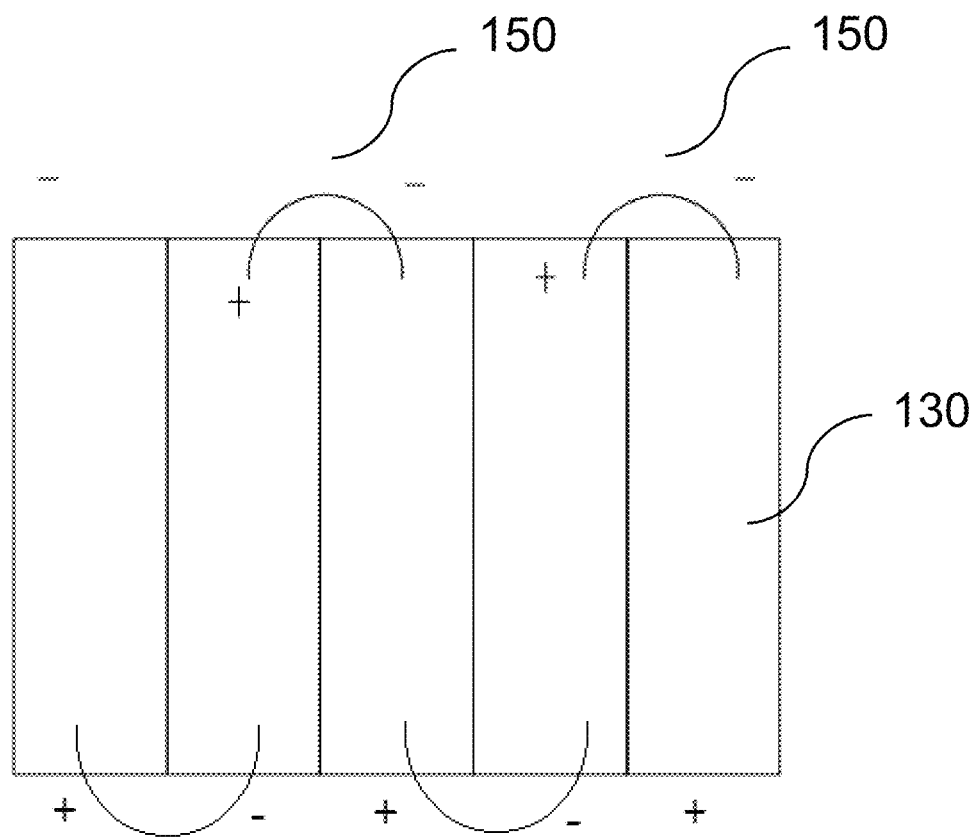
FIG. 14 shows an example three-layer configuration of individual battery cells and a secondary electrical circuit path interconnecting the battery cells in series, comprising the removable battery pack.
Figure 15A:
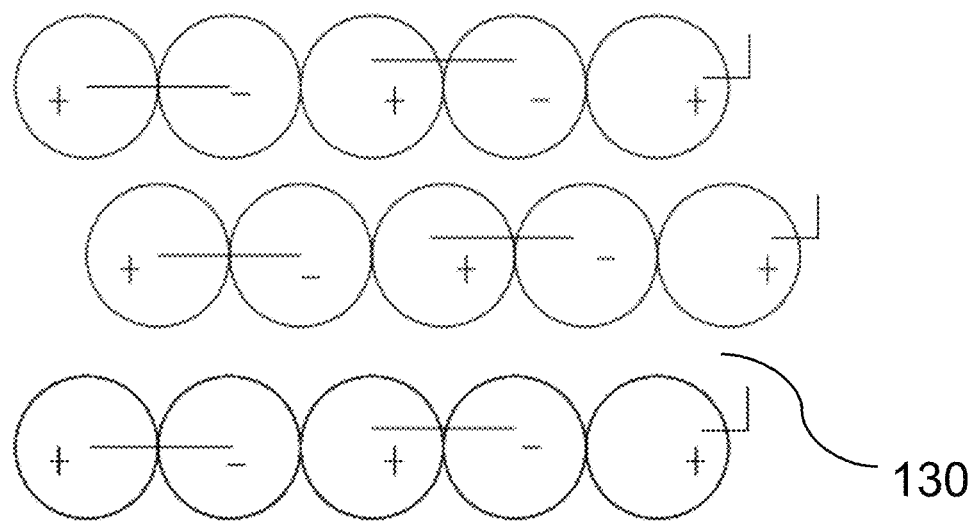
FIGS. 15A and 15B show opposing side views of an example three-layer configuration of individual battery cells and a secondary electrical circuit path interconnecting the battery cells in series, comprising the removable battery pack.
Figure 15B:
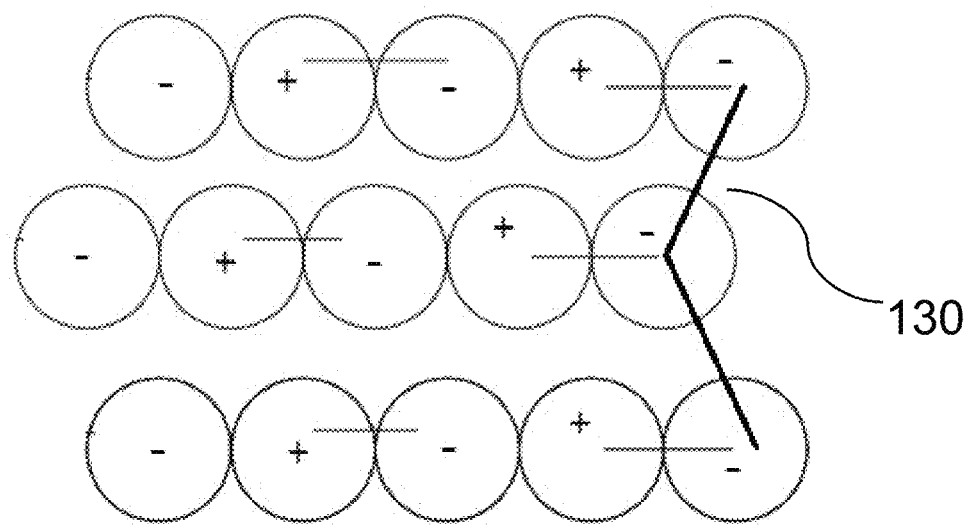

The positioning of the primary electrical cut-off switches (110,210) and the secondary electrical cut-off switches (140) in the system is such that the secondary electrical cut-off switches (140) located on the secondary electrical circuit path (150) will be the first to be closed as the battery pack (100) is slidably connected with the battery pack receiving member (200A) of the power tool (200), followed thereafter by closure of the primary electrical cut-off switches (110, 210) located on the primary electrical circuit path (250). Once both the primary and secondary electrical cut-off switches (110,210)(140) are closed, power may then be supplied to the power tool (200) from the battery pack (100) connected thereto for instance by squeezing a trigger of the power tool (200). FIGS. 11-13 shows electrical circuit diagrams representing the sequence of closure of the primary and secondary electrical cut-off switches as the battery pack (100) is gradually connected to the power tool (200. In FIG. 11, the battery pack (100) is not yet connected with the power tool (100) and all primary electrical cut-off switch (110,210) and secondary electrical cut-off switches (140) are therefore still in their Normally Opened states. FIG. 12 shows the secondary electrical cut-off switches (140) both now in closed states when the battery pack (100) has been partially slid into connection with the power tool (200) but with the primary electrical cut-off switch (110,210) still in its Normally Opened state as the first electrical connector members (210) disposed on the power tool (200) have not yet fully connected with second electrical connector members (110) located on the battery pack (100). Thereafter, FIG. 13 shows the primary electrical cut-off switch (110,210) and the secondary electrical cut-off switches (140) now closed in response to the battery pack (100) being fully connected with the power tool (200) to enable power to be supplied to the power tool (200) via the electrical circuit path. Although not shown in the drawings, the order of opening of the switches will of course be readily understood to take place in reverse to as depicted in the sequence of FIGS. 11-13.

Figure 16:
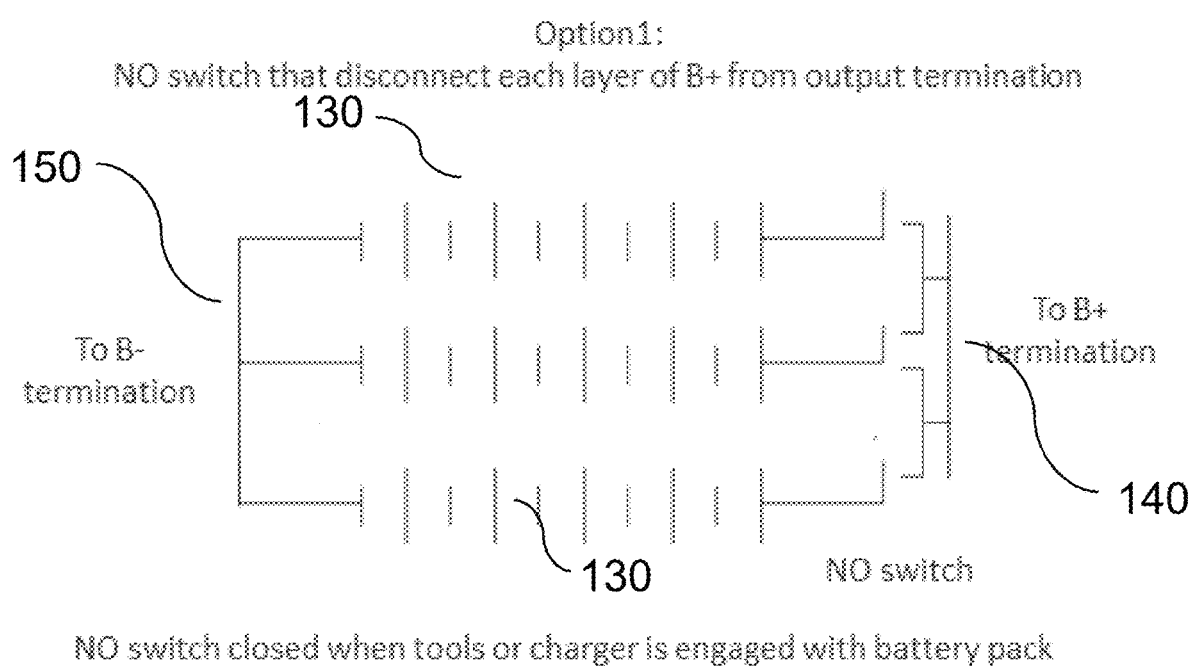
FIG. 16 shows an example embodiment of a single secondary electrical cut-off switch located at a positive battery terminal of at least one battery cells along the secondary electrical circuit path connecting the battery cells within the removable battery pack, whereby the secondary electrical cut-off switch is in a Normally Opened state when the removable battery is detached from the battery pack receiving member of the power tool and configured for closure when the removable battery pack is slidably connected with the battery pack receiving member of the power tool.
Figure 17A:
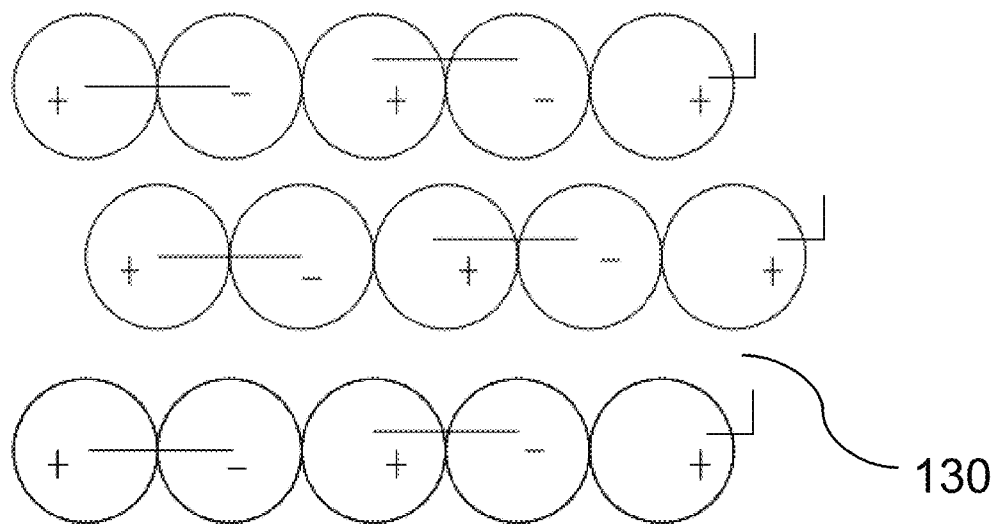
FIGS. 17A and 17B show opposing side views of another example three-layer configuration of individual battery cells and a secondary electrical circuit path interconnecting the battery cells in series, comprising the removable battery pack.
Figure 17B:
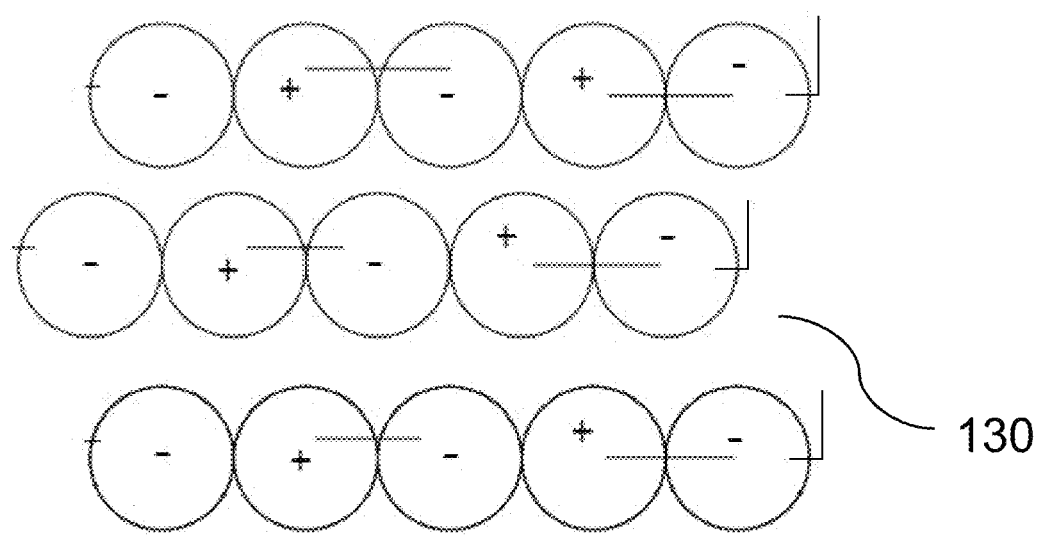
Figure 18:
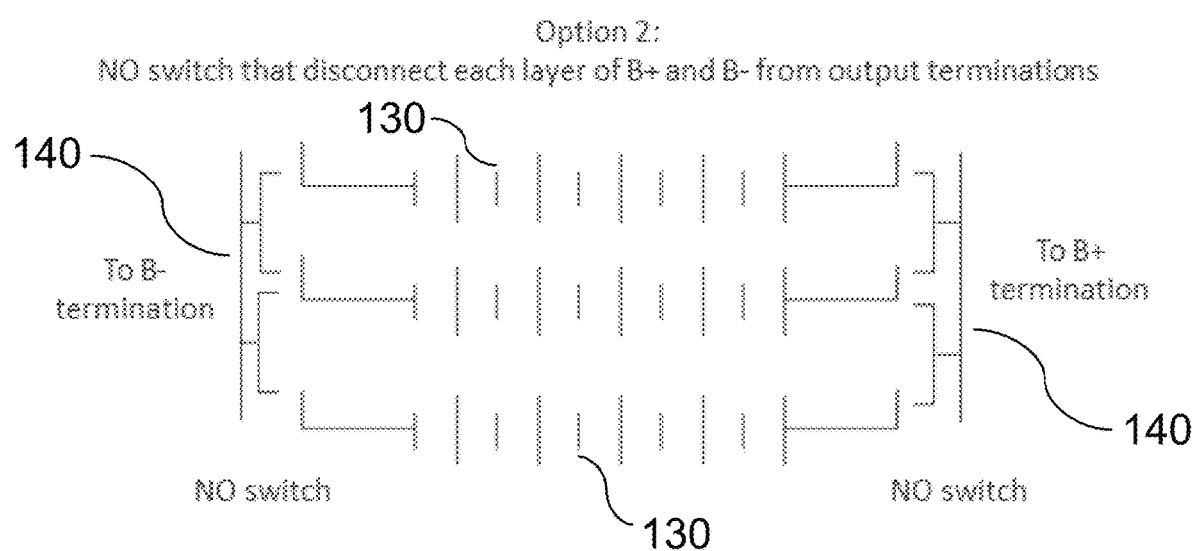
FIG. 18 shows another example embodiment of a pair of secondary electrical cut-off switches located at both positive and negative battery terminals of at least one battery cell along the secondary electrical circuit path connecting the battery cells within the removable battery pack, whereby the pair of secondary electrical cut-off switches are in a Normally Opened state when the removable battery is detached from the battery pack receiving member of the power tool and configured for closure when the removable battery pack is slidably connected with the battery pack receiving member of the power tool.

It would be appreciated that in alternate embodiments of the invention it may not be necessary to include multiple primary or secondary electrical cut-off switches (140) located on the primary electrical circuit path (250) and the secondary electrical circuit path (150) respectively. For instance, by way of example, FIG. 16 depicts one electrical circuit configuration in which only one secondary electrical cut-off switch (140) is located at a positive terminal of a battery cell(s) (130) within the battery pack (100) to disconnect one or more or the battery cells and thereby reduce the potential overall output power capacity of the battery pack (100) in the event of an inadvertent shorting of the battery terminals during storage or shipping. FIG. 18 shows a preferable electrical circuit configuration where each of a pair of secondary electrical cut-off switches (140) are located on regions of the secondary electrical circuit path (150) adjacent positive and negative terminals of at least one battery cell (130) within the battery pack (100). This configuration is preferable and advantageous for redundancy in the event of failure of one of the secondary electrical cut-off switches (140) and reduces overall risk of fire in the event of failure of a single secondary electrical cut-off switch on the battery pack (100).

Figure 8:
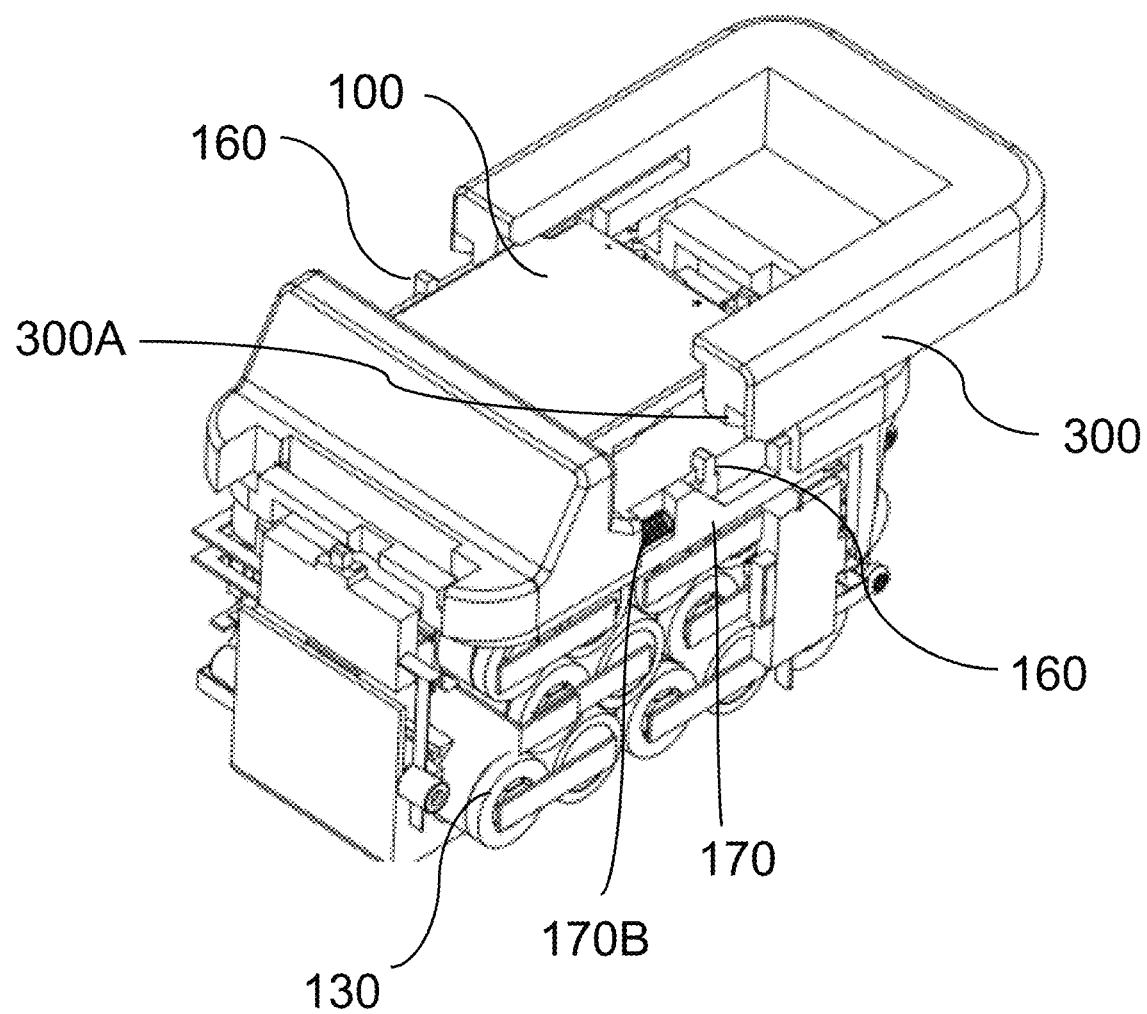
FIG. 8 shows the removable battery pack of the second embodiment in which an optional protective covering is in the process of being slidably engaged with the removable battery pack.
Figure 9:
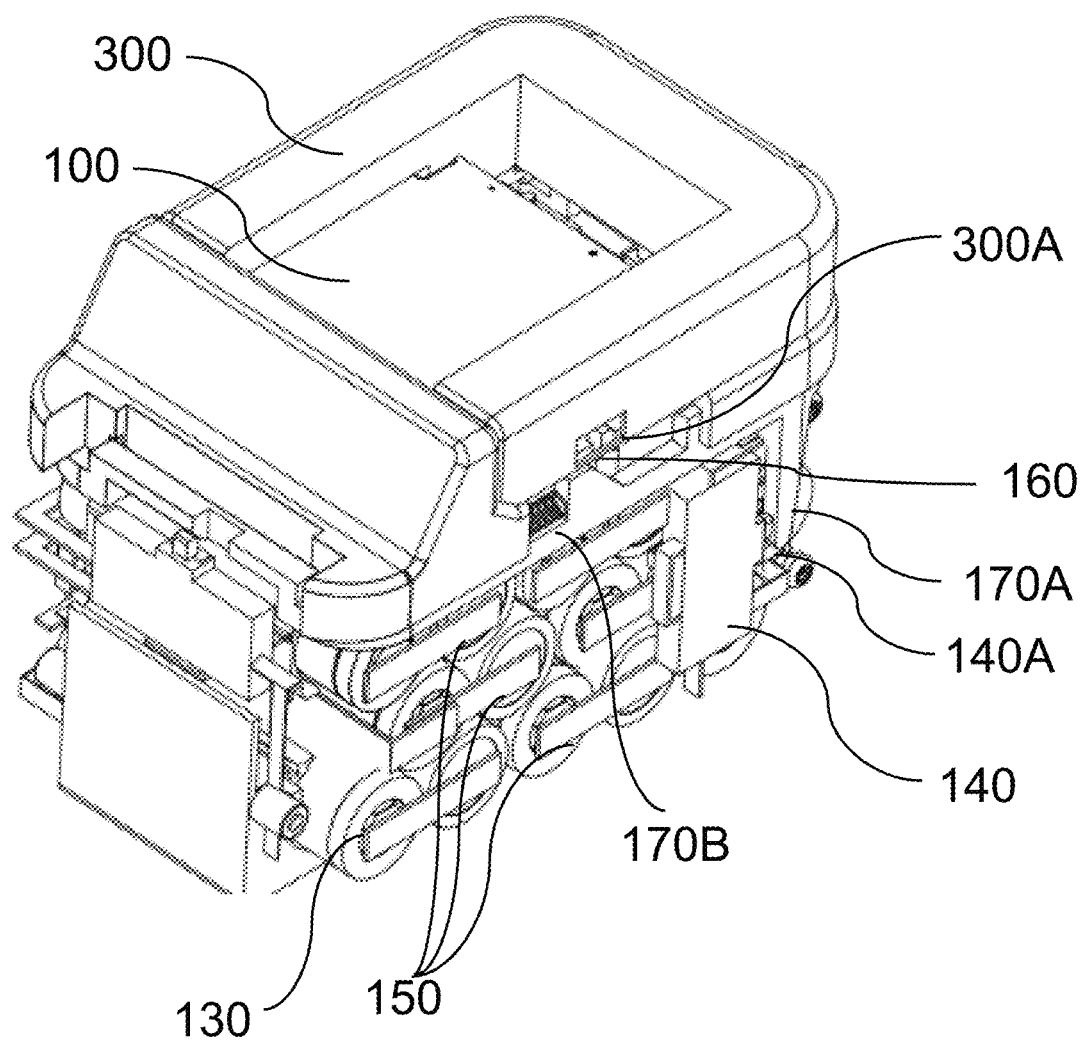
FIG. 9 shows the removable battery pack of the second embodiment in which the optional protective covering fully slidably engaged with the removable battery pack.

When the removable battery pack (100) is disconnected from the power tool (200), the driving members (160) are exposed and if inadvertently depressed, may cause the secondary electrical cut-off switches (140) to close at regions of the secondary electrical circuit path (150) connecting the battery cells (130) in series. To alleviate this potential problem of inadvertent movement of the driving members (160), a protector member (300) is provided which includes a shape contour configured for slidable engagement with at least a portion of the battery pack so that when the battery pack (100) is detached from the power tool (200) the rigid protector member sits on top of the frame member (170). In particular, protector member (300) includes a recesses (300A) suitably sized, shaped and positioned to allow for the driving members (160) to extend into them when the protector member (300) is engaged with the disconnected battery pack (100). In this way, it is difficult for the driving members (160) to be inadvertently depressed so as to cause inadvertent closure of the secondary electrical cut-off switches (140). FIG. 8 depicts the protector member (300) before being slidably engaged with the disconnected battery pack (100) whilst FIG. 9 shows the protector member (300) engaged with the battery pack (300) so as to cover over the driving members (160) and with FIG. 9 shown in cut-away view, the driving member 160) on one side of the battery pack visibly extended upwardly into the recess of the protector member (300).

It would be apparent that various advantages may be provided by embodiments of the present invention including that it may assist in providing a system which minimizes or at least alleviates relatively high power output from the battery pack in the event of an inadvertent shorting of the battery terminals during storage or shipping. Therefore, battery packs such as those operable in accordance with embodiments of the present invention may be safer than certain existing battery packs. Furthermore, in certain embodiments, by virtue of the secondary electrical cut-off switch(es), which are configured for automatic closure upon connection of the battery pack (100) with the power tool (200), this obviates the inconvenience of time and labor required to solder or otherwise reconnect the wiring within the battery pack (100) (that has been manually disconnected at the factory prior to storage or shipping of the battery packs) to make the battery pack operable prior to insertion of the battery pack (100) with the power tool (200). Therefore additional efficiencies are introduced at both the battery pack manufacturing process and at the user end once the battery pack(s) have been shipped to the end user.

Furthermore, as embodiments of the present invention allow for secondary electrical cut-off switches to be located at regions of the secondary electrical circuit path connecting the terminals of the battery cells (130) within the battery pack (100), it is possible to configure the maximum potential power output from the battery pack (100) in the event of inadvertent short-circuiting of the battery terminals during shipping. This may therefore assist in complying with international shipping requirements for battery devices to a maximum power output rating. The number and location of the secondary electrical cut-off switches along the secondary electrical circuit path interconnecting the battery terminals of the battery cells is a design choice taking into account the total threshold power output of the battery pack which must be adhered to.

Furthermore, in certain embodiments, as the switching contact members comprising a primary electrical cut-off switch may be located partly on the electric power tool and partly on the battery pack, the primary cut-off switch cannot be closed unless the battery pack (100) is actually connected to the power tool (200).

Furthermore, the use of a multiple return spring mechanism in embodiments of the present invention for redundancy assists in alleviating risk of inadvertent closure of cut-off switches located on the battery pack when disconnected from the power tool. Furthermore, the embodiments of the present invention allow for a novel mechanism by which the removable battery pack may be rendered operable to supply a suitable amount of power to a motor of the power tool (200) automatically and in one motion by simply sliding the battery pack (100) into connection with the battery pack receiving member (200A) of the power tool (200) as describe above.

It would be understood that whilst embodiments of the present invention described herein refer to a removable battery pack which may be removably connected to and from the electric power tool multiple times, it is possible that in alternate embodiments the battery pack may be intended for one-time connection to the electric power tool.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A battery pack for electrical connection with a battery pack receiving member (200A) of a machine (200) so that the battery pack (100) is operable to supply a suitable amount of power to the machine (200) for operation of the machine, the battery pack including:
    an electrical circuit path (150,250) that is configured for electrically-connecting the battery pack (100) to the machine (200) so that the suitable amount of power is able to be supplied to the machine (200), the electrical circuit path (150,250) including a primary electrical circuit path (250) that is configured for electrically-connecting output terminals of the battery pack (100) to an electrically-operable motor or actuator of the machine (200) when the battery pack (100) is connected to the battery pack receiving member (200A) of the machine (200), and, a secondary electrical circuit path (150) that is configured for electrically-connecting a plurality of discrete battery cells (130) of the battery pack (100) in series or parallel; and
    an electrical switch (110,210) including
    a first electrical contact member (210) disposed along a first region of the electrical circuit path (150,250); and
    a second electrical contact member (110) that is movable relative to the first electrical contact member (210) along said first region of the electrical circuit path (150,250),
    wherein the first electrical contact member (210) and the second electrical contact member (110) collectively form contact members of the electrical switch (110, 210) for opening and closing the electrical circuit path (150,250);
    wherein, responsive to the battery pack (100) being connected to the battery pack receiving member (200A) of the machine (200), the second electrical contact member (110) is configured for movement relative to the first electrical contact member (210) to cooperatively form a first configuration in which the electrical switch (110,210) closes the electrical circuit path (150,250) causing the suitable amount of power to be supplied from the battery pack (100) to the machine (200); and
    wherein, responsive to the battery pack (100) being disconnected from the battery pack receiving member (200A) of the machine (200), the second electrical contact member (110) is configured for movement relative to the first electrical contact member (210) to cooperatively form a second configuration in which the electrical switch (110,210) opens the electrical circuit path (150,250) so that said output terminals of the battery pack (100) are electrically isolated from at least one of the plurality of discrete battery cells (130), electrical connectivity with at least a section of the battery cells in the battery pack (100) is cut off, and the suitable amount of power is not able to be supplied from the battery pack (100) to the machine (200) via the electrical circuit path (150,250).

2. The battery pack as claimed in claim 1 including a pair of electrical switches comprising respective first electrical contact members (210) and respective second electrical contact members (110) corresponding to the first electrical contact members (210):
    wherein, responsive to the battery pack (100) being connected to the battery pack receiving member (200A) of the machine (200), the second electrical contact members (110) are configured for movement relative to their corresponding first electrical contact members (110) to cooperatively form first configurations which electrically close the respective electrical switches along the electrical circuit path via which the suitable amount of power is able to be supplied from the battery pack (100) to the machine (200); and
    wherein, responsive to the battery pack (100) being disconnected from the battery pack receiving member (200A) of the machine (200), the second electrical contact members (110) are configured for movement relative to their corresponding first electrical contact members (210) to cooperatively form second configurations which electrically open the respective electrical switches along the electrical circuit path via which the suitable amount of power is not able to be supplied from the battery pack (100) to the machine (200).

3. A battery pack system for use in connecting a battery pack (100) of claim 1 to a battery pack receiving member (200A) of a machine (200) so that the battery pack (100) is operable to supply a suitable amount of power to the machine (200) for operation of the machine (200) via the electrical circuit path.

4. The battery pack system as claimed in claim 3 wherein the machine includes an electric power tool or an electrical gardening tool.

5. A machine configured for use with a battery pack (100) according to claim 1.

* * * * *